US008477108B2

(12) United States Patent
Wäller et al.

(10) Patent No.: US 8,477,108 B2
(45) Date of Patent: Jul. 2, 2013

(54) METHOD FOR DISPLAYING INFORMATION IN A VEHICLE AND DISPLAY DEVICE FOR A VEHICLE

(75) Inventors: Christoph Wäller, Braunschweig (DE); Katja Lemke, Braunschweig (DE); Rainer Dehmann, Berlin (DE); Mathias Kuhn, Berlin (DE)

(73) Assignee: Volkswagen AG, Wolfsburg (DE)

( * ) Notice: Subject to any disclaimer, the term of this patent is extended or adjusted under 35 U.S.C. 154(b) by 328 days.

(21) Appl. No.: 12/674,392

(22) PCT Filed: Jul. 8, 2008

(86) PCT No.: PCT/EP2008/058842
§ 371 (c)(1),
(2), (4) Date: May 16, 2011

(87) PCT Pub. No.: WO2009/024400
PCT Pub. Date: Feb. 26, 2009

(65) Prior Publication Data
US 2011/0205162 A1    Aug. 25, 2011

(30) Foreign Application Priority Data

Aug. 21, 2007  (DE) .......................... 10 2007 039 442

(51) Int. Cl.
*G06F 3/041*    (2006.01)

(52) U.S. Cl.
USPC .......................................... 345/173; 345/156

(58) Field of Classification Search
USPC ............ 345/156, 173, 174; 178/18.06, 19.03; 701/36; 715/700, 841, 848
See application file for complete search history.

(56) References Cited

U.S. PATENT DOCUMENTS

| 5,689,284 | A | 11/1997 | Herget |
| 5,751,275 | A | 5/1998 | Bullister |
| 6,052,110 | A | 4/2000 | Sciammarella et al. |
| 6,430,501 | B1 | 8/2002 | Slominski |
| 6,448,987 | B1* | 9/2002 | Easty et al. .................. 715/834 |
| 6,452,570 | B1 | 9/2002 | Kuenzner |
| 6,538,635 | B1* | 3/2003 | Ringot ......................... 345/156 |

(Continued)

FOREIGN PATENT DOCUMENTS

| DE | 44 46 431 | 6/1996 |
| DE | 198 37 510 | 2/2000 |

(Continued)

OTHER PUBLICATIONS

International Search Report and Written Opinion, PCT Application No. PCT/EP2008/058842.

(Continued)

*Primary Examiner* — Joe H Cheng
(74) *Attorney, Agent, or Firm* — Kenyon & Kenyon LLP (57) ABSTRACT

In a method for displaying information in a motor vehicle, a plurality of objects are represented graphically with the aid of a display mounted in a motor vehicle. A user-interface device generates graphics data which control the display such that the graphical objects are shown disposed on a virtual, perspectively displayed ring, and that in response to an input with the aid of an input device, an arithmetic logic unit of the user-interface device alters the graphics data such that the graphical objects on the virtual ring rotate like a carousel. A corresponding display device is provided.

27 Claims, 5 Drawing Sheets

U.S. PATENT DOCUMENTS

| | | |
|---|---|---|
| 6,642,936 B1 | 11/2003 | Engholm et al. |
| 6,769,320 B1 | 8/2004 | Bollgohn et al. |
| 6,898,523 B2 | 5/2005 | Cochlovius et al. |
| 6,956,540 B1 | 10/2005 | Yoshihara et al. |
| 7,111,788 B2 * | 9/2006 | Reponen ............... 235/472.01 |
| 7,730,425 B2 * | 6/2010 | de los Reyes et al. ........ 715/835 |
| 7,966,577 B2 * | 6/2011 | Chaudhri et al. ............. 715/835 |
| 8,028,250 B2 * | 9/2011 | Vronay et al. ................ 715/853 |
| 2002/0041260 A1 | 4/2002 | Grassmann |
| 2003/0164818 A1 | 9/2003 | Miller-Smith |
| 2007/0157126 A1 | 7/2007 | Tschirhart et al. |
| 2008/0161997 A1 | 7/2008 | Wengelnik et al. |

FOREIGN PATENT DOCUMENTS

| | | |
|---|---|---|
| DE | 100 01 988 | 7/2001 |
| DE | 199 41 955 | 8/2001 |
| DE | 100 39 432 | 12/2001 |
| DE | 100 58 244 | 5/2002 |
| DE | 101 17 030 | 10/2002 |
| DE | 101 18 765 | 5/2003 |
| DE | 101 55 549 | 5/2003 |
| DE | 103 03 792 | 8/2004 |
| DE | 103 05 341 | 8/2004 |
| DE | 600 18 874 | 7/2005 |
| DE | 601 06 175 | 11/2005 |
| DE | 10 2004 029 203 | 12/2005 |
| DE | 10 2004 048 956 | 4/2006 |
| DE | 10 2005 035 111 | 9/2006 |
| DE | 10 2005 017 313 | 10/2006 |
| DE | 10 2006 002 679 | 8/2007 |
| EP | 0 547 993 | 6/1993 |
| EP | 1 052 566 | 11/2000 |
| EP | 1 207 072 | 5/2002 |
| EP | 1 212 208 | 6/2002 |
| EP | 1 560 102 | 8/2005 |
| GB | 2 434 068 | 7/2007 |
| JP | 2006-260265 | 9/2006 |
| WO | WO 00/04440 | 1/2000 |
| WO | WO 02/39712 | 5/2002 |
| WO | WO 2005/091122 | 9/2005 |
| WO | WO 2006/108617 | 10/2006 |

OTHER PUBLICATIONS

Almy, et al., "User interface for zooming of graphic displays," Research Disclosure, Mason Publications, Hampshire, GB, vol. 312, No. 46, Apr. 1, 1990.

International Preliminary Report on Patentability, PCT application No. PCT/EP2008/058842.

* cited by examiner

METHOD FOR DISPLAYING INFORMATION IN A VEHICLE AND DISPLAY DEVICE FOR A VEHICLE

FIELD OF THE INVENTION

The present invention relates to a method for displaying information in a motor vehicle, in which a plurality of objects are represented graphically with the aid of a display mounted in the motor vehicle. The present invention further relates to a display device for a motor vehicle having a display for the graphic representation of information which is mounted in the motor vehicle, a user-interface device by which graphics data are able to be generated for objects displayable on the display, and an input device coupled to the user-interface device.

BACKGROUND INFORMATION

In a motor vehicle, there are various information and communication areas to which indicating instruments are assigned. They are used to provide information to the driver and passengers. Moreover, they are able to assist the driver in navigation or communication with the outside world. In particular, the display is able to visually represent vehicle data related to traffic or operation. What is termed the instrument cluster is disposed in the vicinity of the primary field of view of the driver. Usually it is located in the cockpit behind the steering wheel and is visible through an opening in the steering wheel. It is used especially to display the speed, the fuel-tank capacity, the radiator temperature and other motor-vehicle information specific to operation. In addition, radio and audio functions may be displayed. Finally, menus for telephone, navigation, telematic services and multimedia applications may be displayed. Usually liquid-crystal displays in various forms are used as display.

For example, German Published Patent Application No. 100 01 988 describes an instrument cluster for the display of operation-related and/or traffic-related data. To permit better comprehension of the diverse offering of information, German Published Patent Application No. 103 03 792 describes a perspective representation of three-dimensional elements.

As a further display device, a vehicle frequently possesses a multifunction display in the center console or above the center console. Such a multifunction operating element is described, for example, in German Published Patent Application No. 199 41 955.

In order to present the various operating and display possibilities in clearly arranged fashion, hierarchical menu structures are frequently used. A menu shows various menu items and, if applicable, graphics or icons assigned to the menu items. Upon selection of a menu item, a submenu having further submenu items opens. This structure may be continued over several hierarchical levels. In addition, instead of being assigned a submenu, a menu item may be assigned a specific display image which represents the information assigned to the menu item.

If such menu structures are used in a motor vehicle, the problem arises that navigation within these menu structures and the absorption of the information indicated by the display claim the attention of the driver in such a way that he is no longer able to safely drive the motor vehicle at the same time. Thus, if the driver wants to operate vehicle devices whose information is shown via the display device, he should do so prior to starting a trip or should interrupt his driving in order to operate them. However, such drawbacks for the user operation are undesirable. In many cases, the result is that the driver operates the devices in the vehicle while driving, although this leads to a distraction which can represent a safety risk.

It is therefore desirable that the information in the motor vehicle be displayed in such a way that it may be comprehended quickly and intuitively by the driver, so that the acquisition of the displayed information does not cause the driver to be distracted while driving. Furthermore, the operation should be executable so intuitively, easily and quickly that the driver is able to operate the devices of the vehicle, whose information is displayed by the display device, while driving, as well, even if possibly complex hierarchical structures are displayable by the display device. The display of information and the operator control associated with a display of information in the motor vehicle thus contribute to safety when driving the motor vehicle.

SUMMARY

In a method and a display device of the type indicated at the outset, the displayed information is able to be comprehended as quickly and intuitively as possible, and a rapid, intuitive and simple operator control of vehicle devices whose information is displayed is provided.

The method of example embodiments of the present invention is characterized in that a user-interface device generates graphics data which control the display such that the objects are shown disposed on a virtual, perspectively displayed ring, and that in response to an input with the aid of an input device, an arithmetic logic unit of the user-interface device alters the graphics data such that the objects on the virtual ring rotate like a carousel. In particular, the virtual ring is displayed in a perspectively three-dimensional manner in an inclined view from above, so that not only the objects on the front portion of the virtual ring are visible, but also objects on the back side of the virtual ring.

Under the term "rotate" within the present context should be understood that the virtual ring is rotated. Since the three-dimensional virtual ring on the display is represented in a two-dimensional, perspective view, the objects are actually shifted with respect to their position on the display.

The depiction of the objects on a virtual ring has the advantage that, even if a multitude of objects are displayed graphically, the viewer finds his way very easily and quickly, and therefore the safety of the vehicle is not impaired, even if the driver absorbs the information displayed by the display while he is driving and, if necessary, operates the vehicle devices assigned to the objects.

A line may be input on the display with the aid of the input device. The angle by which the objects are rotated is then calculated as follows:

$$\alpha_{Rotation} = \frac{S}{B} \cdot 360°,$$

where
$\alpha_{Rotation}$ is the total angle of rotation in degrees,
S is the length of the line defined using the input device and
B is the width of the display.

Of the line defined by the input device, preferably only the length of the horizontal component aligned parallel to the width of the display is used for parameter S. Thus, of the line on the display input via the input device, only a projection in the horizontal is utilized for calculating the total angle of rotation.

In the method, the manner in which the objects on the virtual ring are rotated like a carousel is of special importance. Namely, how well and how quickly the observer is able to comprehend the objects displayed on the virtual ring, even when they are rotated like a carousel, is dependent on the representation of this rotation. In this context, many animation techniques which are used outside of the motor vehicle for the variable graphic display of objects are unsuitable for use in the motor vehicle, since in the motor vehicle, the observer only looks at the display for brief moments. Therefore, the time characteristic of the change in a position of a graphically displayed object is also of special significance for safety in driving the vehicle.

In the method, when calculating the graphics data for successive intermediate images for the representation of the rotation, the successive angles of rotation α are calculated by the following computational steps:

$$n = \frac{t}{d} - 1; \quad \text{(i)}$$

$$\alpha = b + \alpha_{Rotation} \cdot (1 - n^4), \quad \text{(ii)}$$

where
t is a system time at which the generated graphics data are shown on the display, with
t=0 at the beginning of the rotation,
d is the duration of the total rotation,
b is the initial angle of an object on the virtual ring,
$\alpha_{Rotation}$ is the total angle of rotation and
steps (i) and (ii) are repeated until t is greater than d.

Furthermore, the duration of the total rotation, i.e., the time from the initial angle of an object to the final angle, which is defined by the user via the input device, is particularly significant for the ascertainability of the displayed information. In the method, the duration of the total rotation is in a range from 2 seconds to 3 seconds, preferably in a range from 2.4 seconds to 2.6 seconds. The duration of 2.5 seconds for the total rotation is especially preferred.

The speed of the motor vehicle may be measured, and the duration of the total rotation may be ascertained as a function of the speed of the motor vehicle. By preference, the higher the speed of the motor vehicle, the longer the duration of the rotation. Namely, at higher speeds, the driver can only direct his eye toward the display for shorter periods. Moreover, the spacing of the time intervals in which the driver directs his eye toward the display is greater, since at higher speeds, the driver must focus greater attention on the driving process. The coupling of the rotational duration of the two-dimensional object to the speed of the motor vehicle therefore ensures that at higher speeds, the driver retains his orientation in the information display, and in this manner, is able to comprehend the information contents easily, quickly and intuitively.

An object may be activated with the aid of the input device, the other objects being pushed graphically into the background after the activation. In particular, each object shown on the display may be activated by the input device. It is therefore not necessary to use the input device to first rotate this object to the front in order to activate it. After an object is activated, preferably the virtual ring, i.e., the objects which are displayed on this ring, is hidden, and only the activated object is displayed. In the hiding of the virtual ring or the objects displayed on it, and the sole display of the activated object, for example, the activated object is enlarged while displacing the other objects of the ring until only the activated object is displayed.

Furthermore, in a display state in which only the activated object is displayed, as a result of an input for the carousel-like rotation of the objects, the last activated object merges into the carousel-like display within the further objects, the objects on the virtual ring rotate in carousel fashion by one position, the virtual ring is again hidden, and finally only the next object is displayed. Because of this change of display in the rendering of the objects, the viewer is able to orient himself more easily within the structure of the displayed objects, even if in each instance he looks at the changing display for only brief time periods, as is often the case in a motor vehicle when the driver absorbs the presentation of information.

After a carousel-like shift of the objects on the virtual ring, the object displayed in the foreground may be activated automatically after a time interval has elapsed. The user therefore only has to rotate the object to be activated into the foreground. The further operating step of activation may be omitted, so that after the object has been rotated, the user may turn his eye away from the display and does not have to further manipulate the input device. This is particularly advantageous for use in a motor vehicle, since the distraction of a driver who is looking at the display and operating the input device is reduced to a minimum.

In particular, the object is a graphic window in which information and/or control elements of the user-interface device are displayed.

The input may be accomplished by touching the display. The input may be accomplished by a gesture of a body part of a user, which is performed in front of the display. The gesture is detected and evaluated by the input device or another downstream device. For example, the gesture of the body part of the user may be detected by a capacitive coupling between the body part and a receiving device. Moreover, the gesture of the body part of the user may be detected by an emission of infrared radiation and reflection of this infrared radiation by the body part of the user.

Preferably, information of driver-assistance systems is displayed by at least a portion of the objects. This information also includes warning signs, which should be understood as quickly as possible by the driver. In this context, it is possible, for example, for objects which include warning signs to be rotated to the front on the virtual ring, and then shown enlarged on the display.

The display device according to example embodiments of the present invention is characterized in that the user-interface device is able to generate graphics data which control the display such that a plurality of objects are shown disposed on a virtual, perspectively displayed ring, and that the user-interface device includes an arithmetic logic unit by which, as a function of an input with the aid of the input device, the graphics data are able to be altered such that the objects on the virtual ring rotate like a carousel.

For the operative control by a user, a line on the display is determinable with the aid of the input device. As explained above, from the length of this line, the arithmetic logic unit is able to calculate the angle by which the objects should be rotated. As explained above, the graphics data for successive intermediate images for successive angles of rotation α to represent the rotation are calculable by the arithmetic logic unit, as well. In this context, the duration of the total rotation lies in a range from 2 seconds to 3 seconds, particularly from 2.4 seconds to 2.6 seconds, and especially preferred, at 2.5 seconds.

The display device may include an interface for the reception of data concerning the speed of the motor vehicle. In this case, the duration of the total rotation is ascertainable by the arithmetic logic unit as a function of these speed data.

The input device may be a touch-sensitive surface of a display. The input device is preferably a device for sensing and evaluating a gesture of a body part of a user, which is performed in front of the display. To this end, in particular, the input device may include a receiving device to which a signal is transmittable capacitively from the body part of the user when the body part is near the receiving device. The position of the body part may be detected with the aid of this capacitive coupling. A gesture by the user may be inferred from the change in this position over time.

Furthermore, the input device may include an infrared-light source or a receiver for reflected infrared light for detecting the gesture of the body part of the user. The position of the body part and its change over time is sensed and interpreted as gesture in this case, as well.

In addition, a proximity sensor may be provided by which the operating intention of a user is detected based on the approach of a body part of the user.

The user-interface device may be coupled to at least one driver-assistance system. In this case, the graphics data are able to be generated by the user-interface device so that information from this driver-assistance system is displayable by at least a portion of the objects.

Further features and aspects of example embodiments of the present invention are explained in more detail below with reference to the appended Figures.

DETAILED DESCRIPTION

Figure 1:
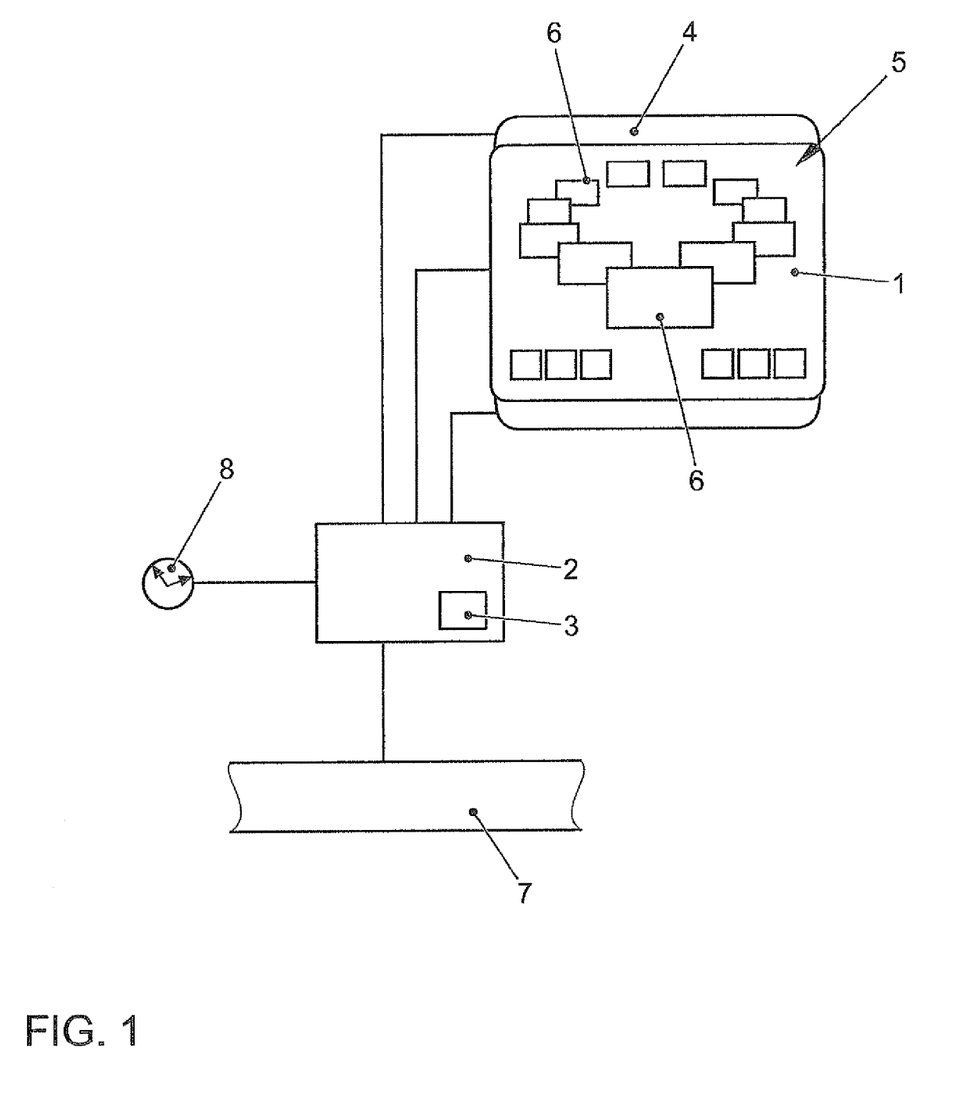
FIG. 1 shows schematically a display device according to an example embodiment of the present invention, and the coupling of this display device to the electronics of the motor vehicle.

The display device includes a display 1 for the graphical representation of information. Display 1 may be a matrix display, e.g., an LCD (liquid crystal display), especially a color display using TFT (thin-film transistor) technology. Furthermore, the display may be what is referred to as a twisted nematic-liquid crystal display (TN-LCD), a super twisted nematic (STN) display, a double-layer STN, an FLC (ferroelectric liquid crystal) display or an SSFLC (surface stabilized ferroelectric liquid crystal). Assigned to display 7 is a back-lighting (not shown) which may be provided by one or more light-emitting diodes. Display 1 is freely programmable, that is, any desired graphics data may be generated, which are represented on display 1.

In particular, display 1 is mounted in an area of the vehicle that is clearly visible for at least the driver. If the operator control of the devices of the vehicle is directly coupled to the placement of the display, so that, for example, the user must bring his hand or his finger at least into the vicinity of display 1 in order to make inputs, then display 1 is positioned in such a way that the driver of the vehicle may easily reach it with his hand or his finger. For instance, display 1 may be accommodated in the center console of the vehicle.

Display 1 is connected to a user-interface device 2, by which graphics data are able to be generated for graphical objects displayable on display 1. User-interface device 2 is also connected to an input device 4, via which the user is able to control devices of the vehicle whose information is displayed on display 1.

For example, input device 4 may be a device for detecting and evaluating a gesture of a body part of a user. For instance, the hand of the user may perform the gesture in front of display 1. In so doing, the three-dimensional position of the hand is detected in a specific location area in front of display 1 without it being necessary to touch display 1. The permitted location area is a function of the placement of display 1 in the motor vehicle. The area should be selected such that the stay of the hand of a user in this location area may be associated unequivocally with an operative control of input device 4. For instance, the boundary of the location area may lie 40 cm to 10 cm in front of display 1. If the hand of the user is brought up closer than this threshold value to display 1, this is detected by input device 4 or a separate proximity sensor, and the approach is interpreted as an operating intention. For instance, this may lead to the objects displayed by display 1 being shown differently. Input device 4 detects the position and the movement of the hand of the user in the location area. In so doing, various gestures performed by the hand are recognized and interpreted as inputs.

For example, input device 4 may include infrared-light sources and infrared-light receivers, which detect the infrared light reflected by the hand. Details of such an input device are described in German Published Patent Application No. 100 58 244, which is hereby incorporated in its entirety by reference thereto. Further input devices which may be used in conjunction with the display device are described in German Published Patent Application No. 103 05 341 and German Published Patent Application No. 10 2004 048 956.

Furthermore, the position of the hand and its change over time may also be detected by an optical system. In this system, for example, a light-emitting diode emits square-wave, amplitude-modulated light. This light is reflected by the object to be detected, i.e., the hand, and after the reflection, arrives at a photodiode. A further light-emitting diode likewise emits square-wave, amplitude-modulated light to the photodiode, this light, however, being phase-shifted by 180°. At the photodiode, the two light signals superimpose and cancel each other out if they have exactly the same amplitude. If the signals do not cancel each other out at the photodiode, the light emission of the second diode is regulated via a control loop in such a way that the total received signal again adds up to zero. If the position of the object changes, the light component which arrives at the photodiode from the first light-emitting diode via the reflection at the object also changes. This brings about a correction of the intensity of the second light-emitting diode through the control loop. The control signal is therefore a measure for the reflection of the light, which is emitted by the first diode, at the object. In this manner, a signal which is characteristic for the position of the object may be derived from the control signal.

In addition, the input device may be a touch-sensitive foil, which is provided on display 1. The position at which display 1 disposed behind the foil is touched may be detected by the foil. For example, the foil may take the form of a resistive touch foil, capacitive touch foil or piezoelectric foil. In addition, the foil may be constructed such that a flow of heat which goes out from the finger of a user, for instance, is measured. Various inputs may be obtained from the evolution of the touching of the foil over time. For example, in the simplest case, the touching of the foil at a specific position may be assigned to one graphical object displayed on display 1. Sliding movements of the finger over the foil may be interpreted, as well. In this manner, the user is able in particular to define a line on display 1 by touching the foil at one point, sliding on the foil toward another point, and taking the finger off the foil at this other point.

Finally, a remote operator-control element may be used as input device. In particular, the remote operator control element is a mechanical control element. For instance, a rotary switch may be provided by which objects shown on the display are controllable and are selectable by pressing the rotary switch. Furthermore, an angle of rotation may also be input directly by way of the rotary switch, as explained later. In addition, separate pressure switches may be disposed around the rotary switch, the arrangement of display fields on the display, which are assigned to the pressure switches, corresponding at least schematically to the arrangement of the pressure switches. The information system may include a multifunction operating device, for example, as described in European Published Patent Application No. 1 212 208.

User-interface device 2 is further coupled to a system clock 8 and to a vehicle bus 7. User-interface device 2 is connected to driver-assistance systems of the vehicle via vehicle bus 7. User-interface device 2 receives data from these driver-assistance systems via vehicle bus 7, and prepares these data so that they are displayed graphically to the driver or the vehicle occupants via display 1. To this end, user-interface device 2 generates graphics data for objects displayable on display 1, which, inter alia, graphically represent the information of the driver-assistance systems. User-interface device 2 is further connected via vehicle bus 7 to various information devices and communication devices, as well as entertainment devices of the vehicle. The varied information from these vehicle devices is processed in user-interface device 2 and converted into graphics data for a graphical representation. For animations of the graphical representation on the display, the user-interface device includes an arithmetic logic unit 3 which refers to system clock 8 in the generating of intermediate images.

In the following, the information readout on display 1 in the vehicle is explained in detail:

The graphics data, which user-interface device 2 generates for display 1, have a hierarchical structure. The starting point for this hierarchical structure is the view of display 1 shown in FIG. 2. It is the first, hierarchically highest level. In it, a plurality of objects are shown disposed on a virtual, perspectively displayed ring 5. The perspective representation shows virtual ring 5 as though the viewer were looking at ring 5 at an angle from above. In this context, one object 6 in the foreground in the perspective representation is shown the largest. To the rear, further objects 6 are displayed, hidden in part by objects 6 located in front of them. One or more devices of the vehicle are assigned to objects 6. The objects in the arrangement on virtual ring 5 shown in FIG. 2 either represent only an indication of the assigned vehicle device, or additionally, already information content of this device.

Figure 2:
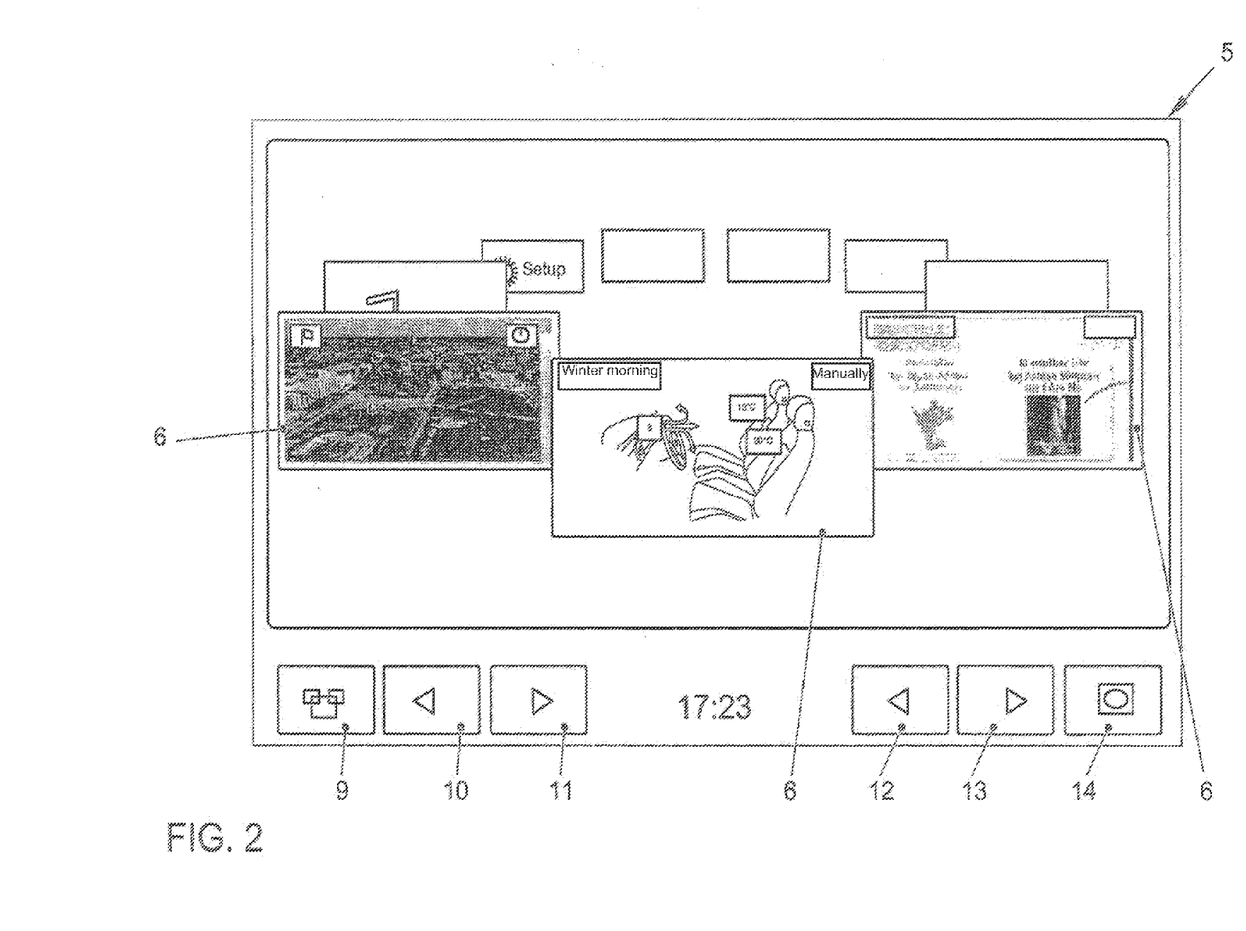
FIG. 2 shows an information display, generated by the method according to an example embodiment of the present invention, in a motor vehicle, in which a plurality of objects are displayed.

In the view shown in FIG. 2, object 6 displayed in the foreground relates to the control for the air-conditioning in the passenger compartment. The object on the right next to and behind this object 6 is assigned to the music-playback device of the vehicle, and the object on the left next to object 6 assigned to the climate control is assigned to the navigation system of the vehicle. An object situated further back relates to the settings of the display device itself.

Below perspectively displayed, virtual ring 5 are command buttons for controlling the graphics data generated by user-interface device 2 for display 1. Using a first command button 9, in any display state, the user is able to return to the initial state in which objects 6 are shown disposed on virtual, perspectively displayed ring 5. Using command buttons 10 and 11, objects 6 on virtual ring 5 may be rotated by one position like a carousel clockwise or counterclockwise, as explained later in detail. Functions within an object 6 may be actuated by command buttons 12 and 13, and using command button 14, for example, the user is able to get directly to the settings menu for the graphics.

Starting from the view of display 1 shown in FIG. 2, each of the objects 6 shown on virtual ring 5 may be selected and activated using input device 4. If the input device includes a touch-sensitive foil, for example, the user may tap with his finger on object 6 to be activated. If, for instance, input device 4 senses the position of the finger or of the hand of the user in front of display 1, it is sufficient that the user bring his finger closer to the position on display 1 at which object 6 to be activated is shown. If an object 6 has been activated by input device 4, in a fluid transition, virtual ring 5 together with objects 6 located on it is made invisible, and only activated object 6 is displayed. In hiding virtual ring 5 and objects 6 located on it until activated object 6 is solely displayed, activated object 6 displaces the other objects 6 of the ring and is continuously enlarged until only activated object 6 is displayed. The graphics data for this fluid transition are calculated by user-interface device 2. In generating the intermediate images, user-interface device 2 refers to system time 8 to ensure that the animation is rendered fluidly without shaking movements.

Figure 3:
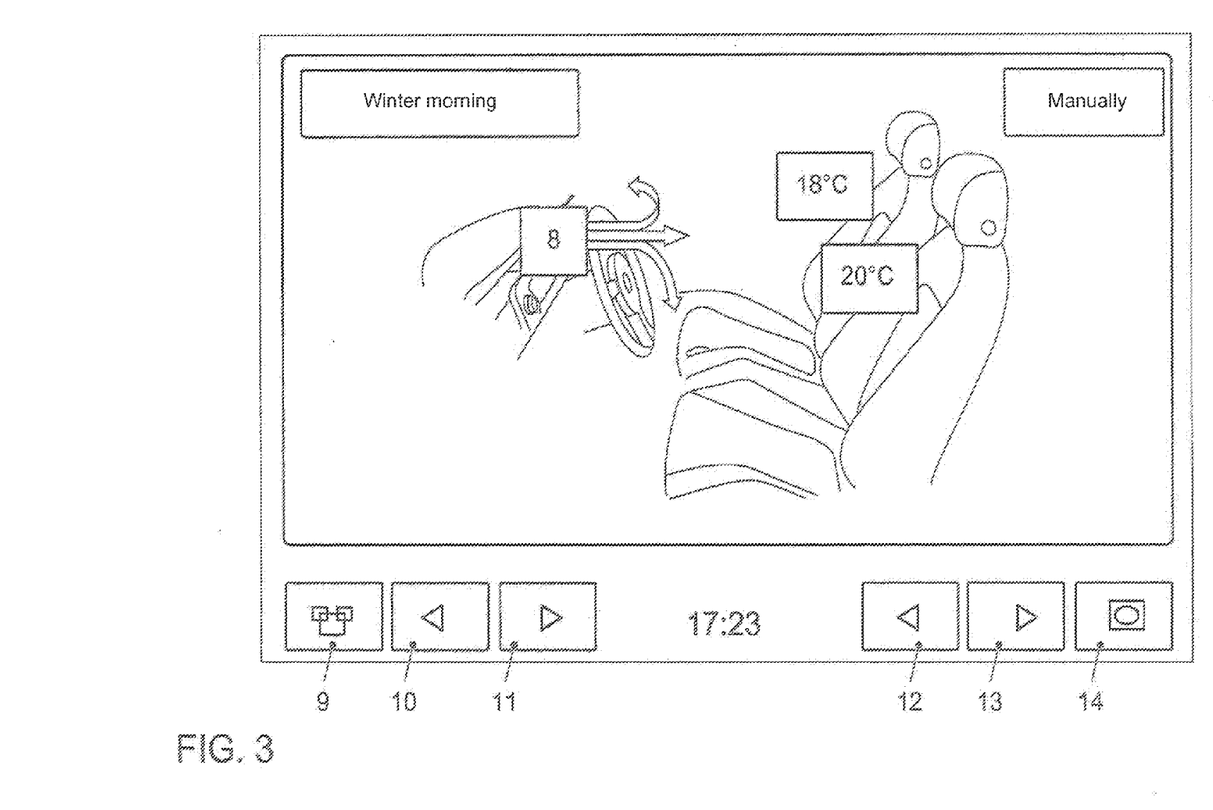
FIG. 3 shows an information display, generated by the method of an example embodiment of the present invention, of an activated object.

For example, FIG. 3 shows a view of display 1 which is displayed in response to an activation of object 6 assigned to the climate control. In this case, the representation of object 6 for the climate control shown in FIG. 2 is displayed enlarged. Command buttons 9 through 14 are retained. If, from this view shown in FIG. 3, the user actuates command button 9, the display of object 6 for the climate control is continuously reduced, and the further objects 6 of virtual ring 5 appear again until the view shown in FIG. 2 is displayed.

On the other hand, if command button 10 or 11 is actuated, object 6 for the climate control is likewise reduced, and the further objects 6 of virtual ring 5 are shown displayed again as in FIG. 2. After that, however, virtual ring 5 is rotated like a carousel clockwise or counterclockwise to the next position, whereupon the next object 6 now in the foreground is automatically activated, and in a fluid transition, is shown enlarged while displacing the other objects 6, until only this next object 6 is displayed.

Figure 4:
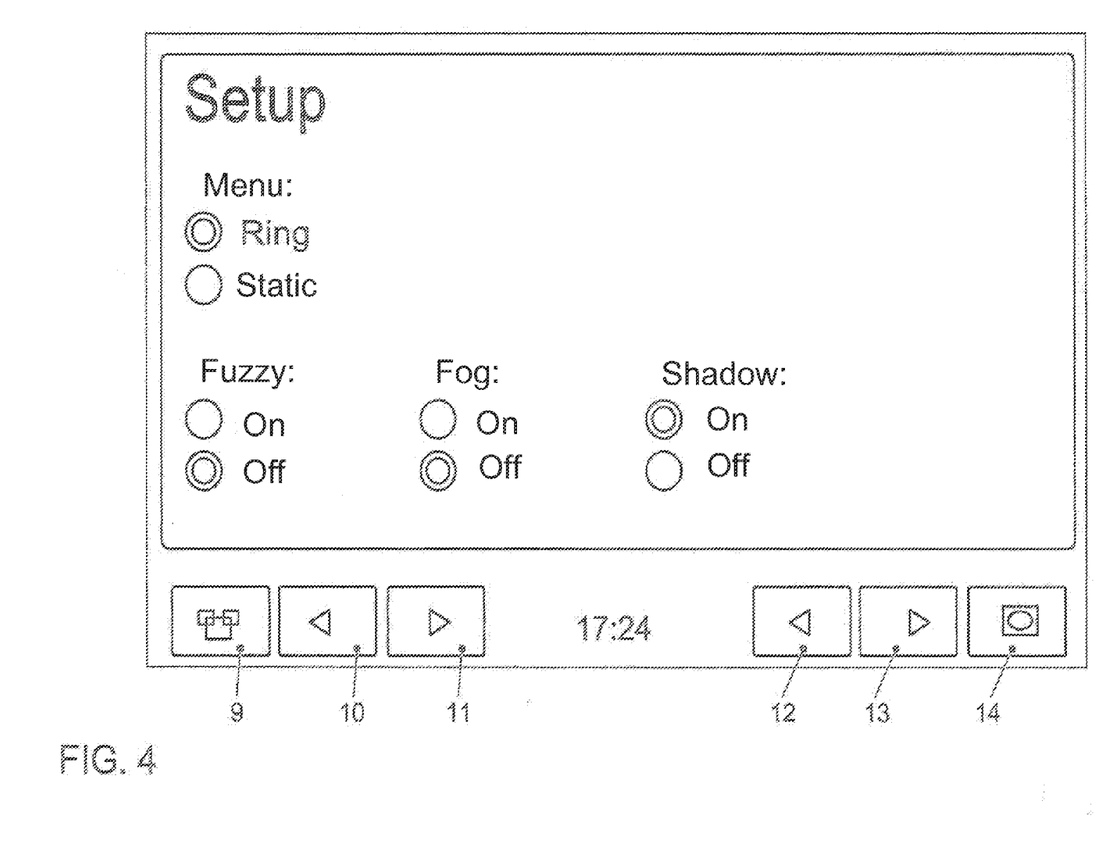
FIG. 4 shows the information display, generated by the method of an example embodiment of the present invention, of another object.

FIG. 4 shows object 6 assigned to the settings of the graphics themselves. In response to the activation of this object 6, various settings for the graphical rendering may be implemented with the aid of input device 4.

When working with the method described above for displaying the quantity of information organized into a hierarchical structure, the transition between two static representations on display 1 is of particular importance. Namely, since the display device is accommodated in a motor vehicle, it is especially important that, in particular, the driver of the motor vehicle is able to quickly, easily and intuitively comprehend the information shown on display 1, even if he only directs his eye to display 1 for brief periods. In this context, it is particularly important that at any time, the viewer is able to orient himself well within the hierarchical structure. Abrupt changes of display images are disadvantageous for this. In particular, fluid transitions between two static representations, during which intermediate images are displayed that clarify the transition between the two static representations, facilitate the orientation in the structure as well as the comprehensibility of the information content.

Moreover, it is especially important how the intermediate images visually display the transition between two static representations. In this context, a linear transition from one static representation to the next static representation is not suitable for the practical application in a motor vehicle. Rather, intermediate images are advantageous which illustrate a movement of objects 6 that is at least partially decelerated. The parameters for the selection of the deceleration and the duration of the transition must also be adapted to the application in the vehicle, so that for the most part, conventional animations familiar from the computer field are not usable.

In the following, it is described in detail how, with the aid of input device 4, the user is able to rotate objects 6, disposed on virtual ring 5, like a carousel on this virtual ring 5.

The starting point for the rotation is the arrangement of objects 6 on virtual ring 5 shown in FIG. 2. First of all, the user now stipulates via input device 4 the total angle of rotation $\alpha_{Rotation}$ by which objects 6 are to be rotated on ring 5. To this end, with the aid of input device 4, for example, the user inputs a line on display 1. If input device 4 includes a touch-sensitive foil, the user may run his finger over the foil to input this line. If input device 4 is able to detect a gesture by the user or a movement of his hand or his finger in front of display 1, the line is input in this manner. If the line is not aligned in the direction of the width of display 1, but rather extends at an angle, preferably only the length of the horizontal component of the input line aligned parallel to the width of display 1 is used. The total angle of rotation $\alpha_{Rotation}$ is calculated from the ratio of the length of this horizontal component of the line to the total width of display 1, a full rotation corresponding to a line whose length is equal to the width of display 1. The total angle of rotation $\alpha_{Rotation}$ is therefore calculated as follows:

$$\alpha_{Rotation} = \frac{S}{B} \cdot 360°,$$

the total angle of rotation $\alpha_{Rotation}$ being indicated in degrees, S being the length of the line or the horizontal component thereof defined by the input device, and B being the width of the display. In this context, angle of rotation α relates to virtual ring 5. Actually, objects 6 in the perspective representation on display 1 are only shifted in the plane of display 1. Angle of rotation α is therefore transformed accordingly in the generation of the graphics data by user-interface device 2.

If input device 4 is a remote operator-control element having a rotary transducer, the total angle of rotation may also be input via the angle of rotation of the rotary transducer.

After total angle of rotation $\alpha_{Rotation}$ has been input by the user with the aid of input device 4, an arithmetic logic unit 3 of user-interface device 2 generates an animation which includes the graphics data for successive intermediate images that represent successive angles of rotation α for objects 6. The transition from the initial state having an initial angle of the objects to a final state in which the objects have been rotated by the entire angle $\alpha_{Rotation}$ takes place through a decelerated movement, which is calculated by the following computational steps:

$$n = \frac{t}{d} - 1; \quad \text{(i)}$$

$$\alpha = b + \alpha_{Rotation} \cdot (1 - n^4). \quad \text{(ii)}$$

In this context, t is the system time, which is retrieved from system clock 8 by arithmetic logic unit 3. At the beginning of the rotation, the system time is equal to zero. In the final state of the rotation, system time t corresponds to duration d of the total rotation. Steps (i) and (ii) are repeated until system time t is greater than duration d of the total rotation.

Figure 5:
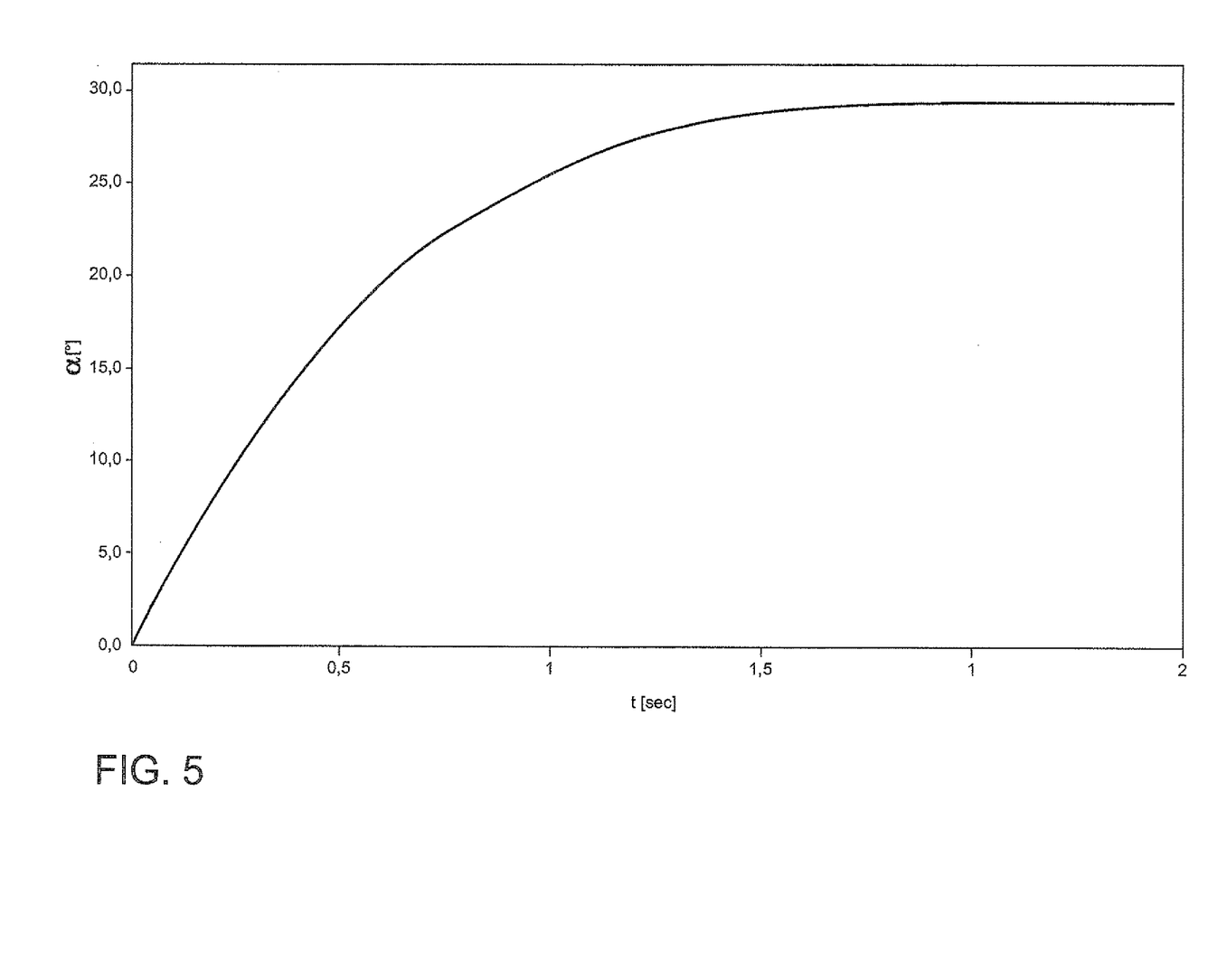
FIG. 5 shows the time characteristic of the angle of rotation of an object upon rotation on the virtual ring.

The selection of the duration of the total rotation is particularly significant for the practical application of the above-described method in a vehicle. Duration d of the total rotation is in a range from 2 seconds to 3 seconds, particularly in a range from 2.4 seconds to 2.6 seconds. Duration d of 2.5 seconds for the total rotation is especially preferred. FIG. 5 shows the time characteristic of angle of rotation α for the intermediate images when an object 6 is rotated by total angle of rotation $\alpha_{Rotation}$ of 30° in 2.5 seconds. It is apparent that initially, the rotative speed is relatively fast, and then is decelerated.

In addition, in the case of the present exemplary embodiment, total angle of rotation $\alpha_{Rotation}$ is adapted to an angle of rotation which corresponds to a carousel-like rotation of objects 6 on virtual ring 5 in which the final state, an object 6 appears in the foreground, as shown in FIG. 2. The angle of rotation input by the user via input device 4 is therefore rounded up or rounded down to this discrete angle of rotation.

If an object is rotated into the foreground by the user with the aid of input device 4, this object 6 is automatically activated after an interval of time has elapsed. Thus, this object 6 is enlarged after the time interval has elapsed, at the same time virtual ring 5 together with the other objects 6 disappearing until only activated object 6 is displayed.

According to a further refinement of the exemplary embodiment, the data of the speedometer of the motor vehicle are transferred into user-interface device 2, and therefore arithmetic logic unit 3, via vehicle bus 7. These data are used by arithmetic logic unit 3 to ascertain the duration of the rotation. In this context, the higher the speed of the motor vehicle, the longer the duration of the total rotation.

| LIST OF REFERENCE NUMERALS | |
|---|---|
| 1 | Display |
| 2 | User-interface device |
| 3 | Arithmetic logic unit |
| 4 | Input device |
| 5 | Virtual ring |
| 6 | Graphical objects |
| 7 | Vehicle bus |
| 8 | System clock |
| 9-14 | Command buttons of an object 6 |

The invention claimed is:

1. A method for displaying information in a motor vehicle, comprising:
  graphically representing a plurality of objects in a display mounted in the motor vehicle;
  generating, by a user-interface device, graphics data adapted to control the display to show graphical objects disposed on a virtual, perspectively displayed ring; and
  altering, by an arithmetic logic unit of the user-interface device, the graphics data in response to an input by an input device to rotate the graphical objects on the virtual ring in the manner of a carousel;
wherein a duration of a total rotation is between 2 and 3 seconds.

2. The method according to claim 1, wherein the duration of the total rotation is between 2.4 and 2.6 seconds.

3. The method according to claim 1, wherein the duration of the total rotation is 2.5 seconds.

4. The method according to claim 1, further comprising:
activating one graphical object by the input device; and
after the activating, pushing graphically into a background the other objects.

5. The method according to claim 4, further comprising after the activating of the one graphical object, hiding the virtual ring and displaying only the activated graphical object.

6. The method according to claim 5, further comprising, during the hiding of the virtual ring and the displaying of only the activated graphical object, enlarging the activated graphical object while displacing the other graphical objects of the ring until only the activated graphical object is graphically displayed.

7. The method according to claim 1, further comprising:
in a display state in which only an activated graphical object is displayed, implementing an input for the carousel-manner rotation of the objects, merging into the carousel-manner display the graphical object last activated, rotating the graphical objects on the virtual ring in a carousel manner by one position, making the virtual ring invisible, and displaying only a next graphical object.

8. The method according to claim 1, further comprising, after a carousel-manner rotation of the graphical objects on the virtual ring, automatically activating the graphical object displayed in a foreground after a time interval has elapsed.

9. The method according to claim 1, wherein the input includes a touching of the display.

10. The method according to claim 1, wherein the input includes a gesture of a body part of a user performed in front of the display, the method further comprising sensing and evaluating the gesture by the input device.

11. The method according to claim 10, wherein the sensing of the gesture includes detecting a capacitive coupling between the body part and a receiving device.

12. The method according to claim 10, wherein the sensing of the gesture includes detecting emission of infrared radiation and reflection of the infrared radiation by the body part of the user.

13. The method according to claim 1, further comprising displaying information from a driver-assistance system by at least a portion of the graphical objects.

14. A method for displaying information in a motor vehicle, comprising:
graphically representing a plurality of objects in a display mounted in the motor vehicle;
generating, by a user-interface device, graphics data adapted to control the display to show graphical objects disposed on a virtual, perspectively displayed ring;
altering, by an arithmetic logic unit of the user-interface device, the graphics data in response to an input by an input device to rotate the graphical objects on the virtual ring in the manner of a carousel;
inputting, by an input device, a line on the display; and
calculating an angle by which the objects are rotated according to the formula:

$$\alpha_{Rotation} = \frac{S}{B} \cdot 360°$$

wherein $\alpha_{Rotation}$ represents a total angle of rotation in degrees, S represents a length of the line defined using the input device, and B represents a width of the display.

15. The method according to claim 14, wherein only the length of a horizontal component aligned parallel to the width of the display is represented by the parameter S.

16. A method for displaying information in a motor vehicle, comprising:
graphically representing a plurality of objects in a display mounted in the motor vehicle;
generating, by a user-interface device, graphics data adapted to control the display to show graphical objects disposed on a virtual, perspectively displayed ring;
altering, by an arithmetic logic unit of the user-interface device, the graphics data in response to an input by an input device to rotate the graphical objects on the virtual ring in the manner of a carousel; and
calculating successive angles of rotation to calculate graphics data for successive intermediate images to represent the rotation according to the following formulae:

$$n = \frac{t}{d} - 1; \text{ and} \qquad \text{Formula (i)}$$

$$\alpha = b + \alpha_{Rotation} \cdot (1 - n^4); \qquad \text{Formula (ii)}$$

wherein $\alpha$ represents the successive angles of rotation, t represents a system time at which the generated graphics data are shown on the display, t=0 represents a beginning of the rotation, d represents a duration of a total rotation, b represents an initial angle of a graphical object on the virtual ring; and
wherein Formula (i) and Formula (ii) are repeated until t is greater than d.

17. A method for displaying information in a motor vehicle, comprising:
graphically representing a plurality of objects in a display mounted in the motor vehicle;
generating, by a user-interface device, graphics data adapted to control the display to show graphical objects disposed on a virtual, perspectively displayed ring;
altering, by an arithmetic logic unit of the user-interface device, the graphics data in response to an input by an input device to rotate the graphical objects on the virtual ring in the manner of a carousel;
measuring a speed of the motor vehicle; and
ascertaining a duration of a total rotation as a function of the speed of the motor vehicle.

18. A display device for a motor vehicle, comprising
a display mounted in the motor vehicle and adapted to graphically represent information;
a user-interface device adapted to generate graphics data for graphical objects displayable on the display;
an input device coupled to the user-interface device;
wherein the user-interface device is adapted to generate graphics data to control the display to show a plurality of graphical objects disposed on a virtual, perspectively displayed ring;
wherein the user-interface device includes an arithmetic logic unit adapted to alter the graphics data as a function of an input by the input device to rotate the graphical objects on the virtual ring in the manner of a carousel; and wherein a duration of a total rotation is between 2 and 3 seconds.

19. The display device according to claim 18, wherein the input device includes a touch-sensitive surface of the display.

20. The display device according to claim 18, wherein the input device includes a device adapted to sense and evaluate a gesture of a body part of a user performed in front of the display.

21. The display device according to claim 20, wherein the input device includes a receiver device to which a signal is transmittable capacitively from the body part of the user when the body part is near the receiver device.

22. The display device according to claim 20, wherein the input device includes an infrared-light source and a receiver adapted to detect infrared light to detect the gesture of the body part of the user.

23. The display device according to claim 18, further comprising a proximity sensor adapted to detect an operating intention of a user based on an approach of a body part of the user.

24. The display device according to claim 18, wherein the user-interface device is coupled to at least one driver-assistance system, and the user-interface device is adapted to generate graphics data to display information from the driver-assistance system by at least a portion of the objects.

25. A display device for a motor vehicle, comprising:
a display mounted in the motor vehicle and adapted to graphically represent information;
a user-interface device adapted to generate graphics data for graphical objects displayable on the display;
an input device coupled to the user-interface device;
wherein the user-interface device is adapted to generate graphics data to control the display to show a plurality of graphical objects disposed on a virtual, perspectively displayed ring;
wherein the user-interface device includes an arithmetic logic unit adapted to alter the graphics data as a function of an input by the input device to rotate the graphical objects on the virtual ring in the manner of a carousel;
wherein the input device is adapted to determine a line on the display, and the arithmetic logic unit is adapted to calculate an angle by which the graphical objects are rotated according to the following formula:

$$\alpha_{Rotation} = \frac{S}{B} \cdot 360°$$

wherein $\alpha_{Rotation}$ represents a total angle of rotation in degrees, S represents a length of the line defined using the input device, and B represents a width of the display.

26. A display device for a motor vehicle, comprising:
a display mounted in the motor vehicle and adapted to graphically represent information;
a user-interface device adapted to generate graphics data for graphical objects displayable on the display;
an input device coupled to the user-interface device;
wherein the user-interface device is adapted to generate graphics data to control the display to show a plurality of graphical objects disposed on a virtual, perspectively displayed ring;
wherein the user-interface device includes an arithmetic logic unit adapted to alter the graphics data as a function of an input by the input device to rotate the graphical objects on the virtual ring in the manner of a carousel;
wherein the arithmetic logic unit is adapted to calculate graphics data for successive intermediate images for successive angles of rotation to represent the rotation according to the following formulae:

$$n = \frac{t}{d} - 1; \text{ and} \qquad \text{Formula (i)}$$

$$\alpha = b + \alpha_{Rotation} \cdot (1 - n^4); \qquad \text{Formula (ii)}$$

wherein α represents the successive angles of rotation, t represents a system time at which the generated graphics data are shown on the display, t=0 represents a beginning of the rotation, d represents a duration of a total rotation, b represents an initial angle of a graphical object on the virtual ring; and wherein Formula (i) and Formula (ii) are repeated until t is greater than d.

27. A display device for a motor vehicle, comprising:
a display mounted in the motor vehicle and adapted to graphically represent information;
a user-interface device adapted to generate graphics data for graphical objects displayable on the display;
an input device coupled to the user-interface device;
wherein the user-interface device is adapted to generate graphics data to control the display to show a plurality of graphical objects disposed on a virtual, perspectively displayed ring;
wherein the user-interface device includes an arithmetic logic unit adapted to alter the graphics data as a function of an input by the input device to rotate the graphical objects on the virtual ring in the manner of a carousel;
wherein the display device includes an interface adapted to receive data concerning a speed of the motor vehicle, wherein the arithmetic logic unit is adapted to ascertain at least one of (a) a duration of a total rotation and (b) a duration of rotation as a function of the speed data.

* * * * *

UNITED STATES PATENT AND TRADEMARK OFFICE
CERTIFICATE OF CORRECTION

PATENT NO. : 8,477,108 B2
APPLICATION NO. : 12/674392
DATED : July 2, 2013
INVENTOR(S) : Wäller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this
Eighth Day of September, 2015

Michelle K. Lee
*Director of the United States Patent and Trademark Office*